May 19, 1931.                K. BERGER                 1,805,800
                              FAIRLEADER
                          Filed July 23, 1929

INVENTOR
Knute Berger
BY
Albert H. Adams
ATTORNEY

Patented May 19, 1931

1,805,800

UNITED STATES PATENT OFFICE

KNUTE BERGER, OF SEATTLE, WASHINGTON

FAIRLEADER

Application filed July 23, 1929. Serial No. 380,332.

My invention relates to improvements in fairleaders of the type adapted to be used as a guide for cables and the object of my invention is to provide a fairleader by which a cable may be guided over rollers with a minimum amount of wear and friction, said fairleader being self adjusting to the direction of pull of the cable.

Another object is to provide a fairleader which is especially adapted for use in connection with a logging apparatus in which cables are wound on drums, but which may be used on various other forms of hauling and hoisting machinery, said fairleader serving to guide the cables so that it will wind onto and off of the drums properly regardless of the direction of the line of pull of the cable.

Other objects are to provide a fairleader of strong and rugged construction which is not expensive to manufacture, which is highly efficient in operation and which reduces wear and friction on the cable to a minimum.

A more specific object is to provide a fairleader having a sheave frame or block for rotatably supporting the sheaves over which the cable passes, said sheave frame having a relatively large shank which is swiveled for rotation in a supporting frame, said shank having a tubular passageway through which the cable passes, and said sheaves being positioned so as to support the cable slightly off center relative to said shank whereby the sheave frame will be self adjusting relative to the pull of the cable.

Other and more specific objects will be apparent from the following description taken in connection with the accompanying drawings.

In the drawings Figure 1 is a view partly in side elevation and partly in vertical section of a fairleader constructed in accordance with my invention.

Figure 1:
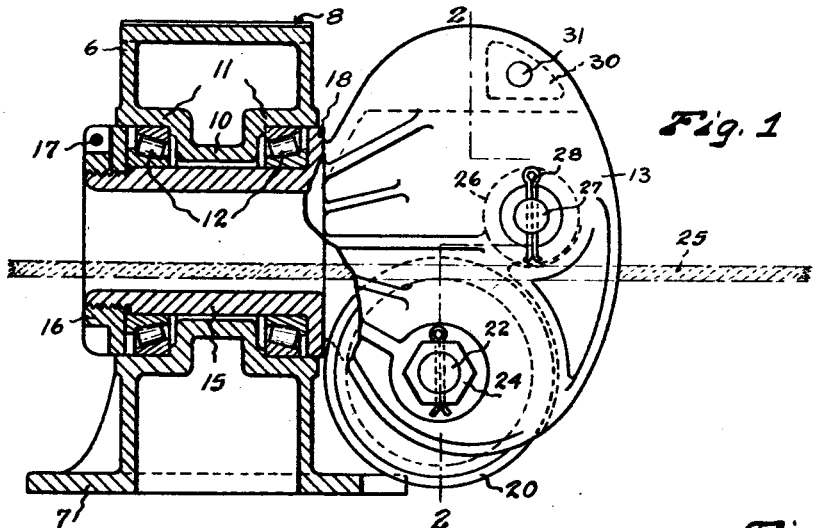
Figure 2:
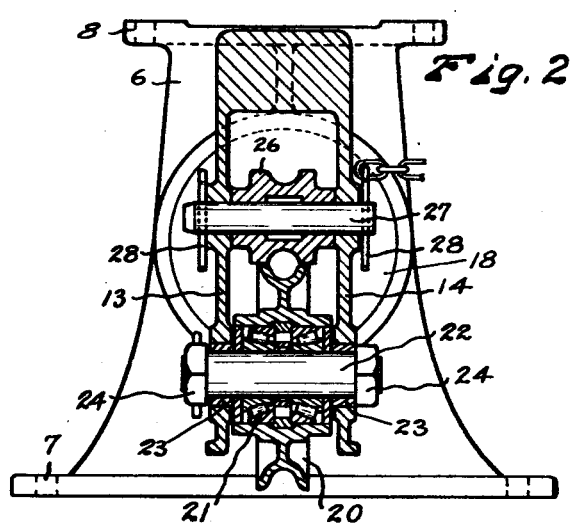
Figure 2 is a cross section substantially on broken line 2—2 of Fig. 1 showing parts in elevation.
Figure 3:
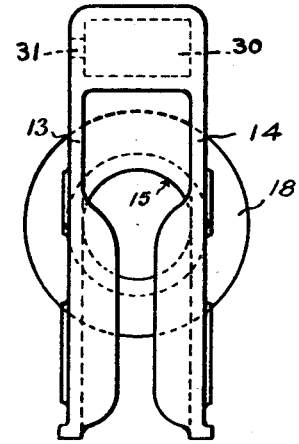
Fig. 3 is a detail being a view in front elevation of the sheave frame.

Referring to the drawings, throughout which like reference numerals designate like parts, 6 designates a main frame of cast metal, having a base 7 adapted to be secured to any suitable support and having a top 8 which is also adapted to be secured to a support. The frame 6 is provided with a transverse, tubular bearing support comprising a central portion 10 of lesser diameter and two bearing receptacles 11 at the ends which are of larger diameter for the reception of combined roller and thrust bearings 12.

The sheave frame comprises two spaced apart side members 13 and 14 which are integral with a cylindrical tubular shank 15. The shank 15 extends through the bearing support in the frame 6 and is rotatable within the bearings 12. An adjustable locking nut 16 is screwed onto the rear end of the shank 15 and locked thereon by means of a transverse bolt 17. A flange 18 is provided at the front end of the shank 15. A larger sheave 20 is rotatably mounted between the two sides, 13 and 14, of the sheave frame by means of a roller bearing 21 which is supported on a bearing pin 22. Bushings 23 are provided where the bearing pin 22 passes through the sides of the sheave frame and nuts 24 are provided on the ends of said bearing pin. The innermost peripheral portion of the sheave 20 is far enough from the central axis of the shank 15 so that a cable 25 which is drawn over said sheave will be slightly off center as respects the axis of the shank 15 thus causing the sheave frame to turn easily in response to a change in the direction of pull of the cable.

A smaller guide sheave 26 is mounted between the side members 13 and 14, on a transverse bearing pin 27. This guide sheave 26 is for the purpose of holding the cable 25 on the larger sheave 20 and it is not intended for the cable to draw over the smaller guide sheave. The bearing pin 27 for the smaller sheave has keys 28 in its ends thus making it readily removable.

For the purpose of counterbalancing the weight of the larger sheave 20 in the sheave frame the said sheave frame is provided, substantially opposite the sheave 20, with receptacles which are filled with babbitt as indicated at 30. The babbitt, in a molten state, may be poured in through holes 31 and any excess babbitt may be removed by drilling, thus making it possible to counterbalance the weight accurately. This overcomes any tendency of the larger sheave 20 to hang down, due to gravity, when the device is mounted in a horizontal position, and leaves the fairleader free to adjust itself automatically to the pull of the cable.

Figure 4:
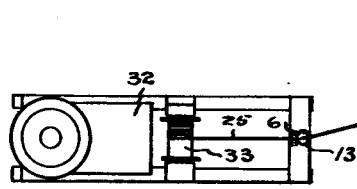
Fig. 4 is a diagrammatic plan view illustrating the method of using this fairleader.

In Fig. 4 I show diagrammatically one method of installing and using my fairleader. In this illustration the fairleader is secured on the forward end of a logging engine 32 which has drums 33 on which the cable 25 may be wound. The cable passes from the drums forwardly through the tubular shank of the fairleader and out between the larger sheave 20 and smaller guide sheave 26. After passing through the fairleader the cable may extend outwardly at an angle but it will always draw over the sheave 20 and if the angle of the cable is changed the fairleader will automatically adjust itself to the new position, the shank 15 turning readily in the bearings 12. The position of the fairleader relative to the drum or drums does not change and the cable always takes onto and off of said drums in the same manner. The foregoing description and accompanying drawings clearly disclose a preferred embodiment of my invention but it will be understood that this disclosure is merely illustrative and that such changes may be made as are fairly within the scope and spirit of the following claims.

I claim:—

1. A fairleader comprising a main frame, a sheave frame having a shank rotatably supported in said main frame, said shank being tubular to permit the passage of a cable therethrough, a sheave in said sheave frame for supporting the cable in a position at one side of the axis of said shank, and counterbalancing means at the opposite side of such axis, whereby the sheave will be held in proper guiding position at all times regardless of the direction of the line of pull of the cable.

2. A fairleader comprising in combination a supporting frame, a tubular shank rotatably supported therein, a sheave frame connected with one end of said shank, and two sheaves journaled therein, one of said sheaves being mounted in the said sheave frame in the lower end portion thereof and the other end portion being weighted to counterbalance said sheave frame when such frame and its tubular shank are turned to different positions to permit the required guiding of a cable that passes through said shank and is in engagement with said sheaves.

3. A fairleader comprising in combination a supporting frame, a sheave frame having a shank rotatably supported in said main frame, said shank being tubular to permit the passage of a cable therethrough, a sheave rotatably mounted in said sheave frame and over which said cable passes, the peripheral portion of said sheave with which said cable engages being spaced from the axis of the shank to support said cable at one side of the central axis, and a counterweight means on said sheave frame for holding said sheave in proper guiding position in various positions assumed by the sheave frame due to the direction of pull of the cable.

In testimony whereof I hereunto affix my signature.

KNUTE BERGER.